April 28, 1936.  A. GOVOROFF  2,039,218

ELECTRICAL COOKING MACHINE

Filed April 16, 1931   3 Sheets-Sheet 1

Inventor
ALEXANDER GOVOROFF
by Henry Pleeh
Attorney.

April 28, 1936.                A. GOVOROFF                2,039,218
                        ELECTRICAL COOKING MACHINE
                  Filed April 16, 1931        3 Sheets-Sheet 2

Inventor
ALEXANDER GOVOROFF
by Henry Hech
Attorney.

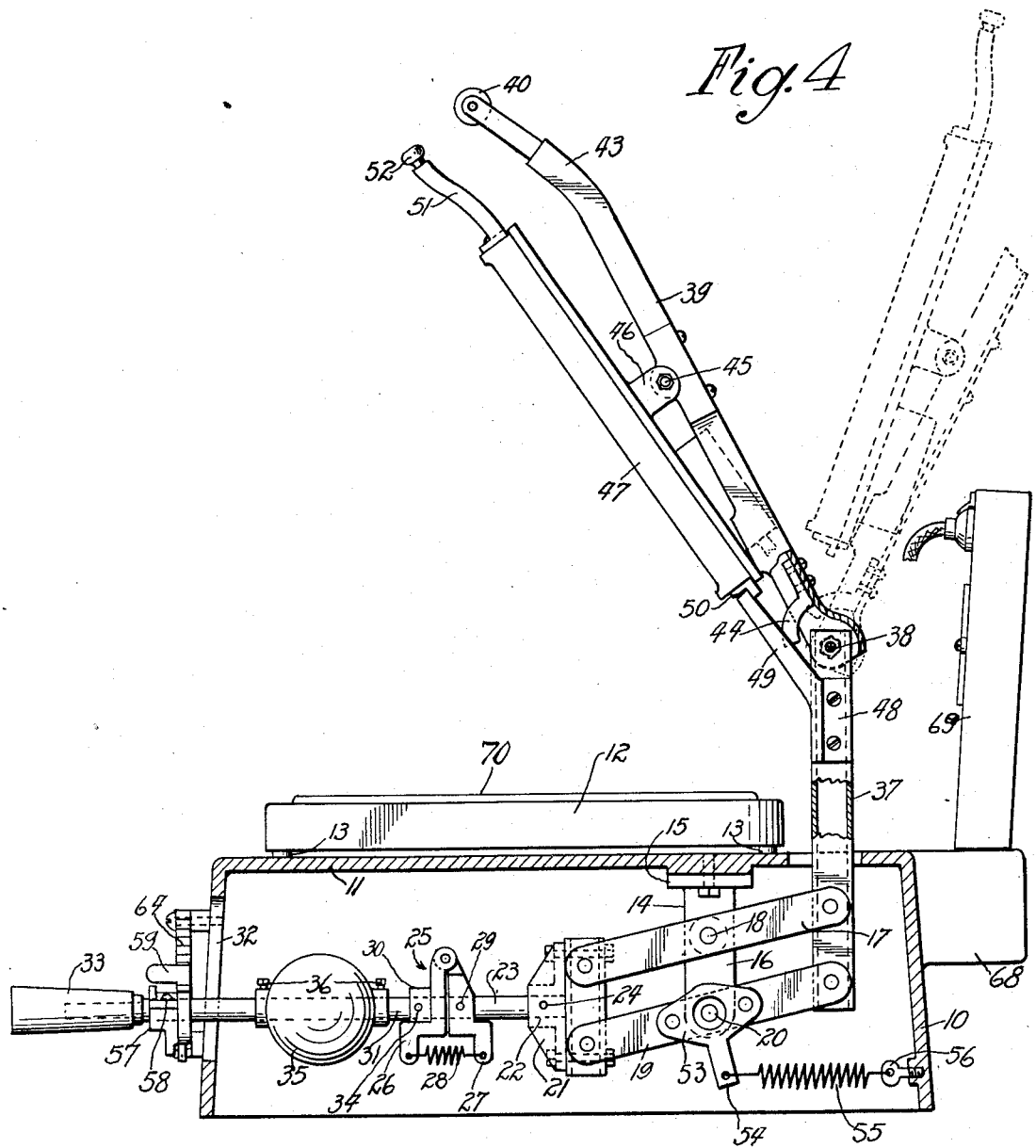

Patented Apr. 28, 1936

2,039,218

UNITED STATES PATENT OFFICE 2,039,218

ELECTRICAL COOKING MACHINE

Alexander Govoroff, St. Louis, Mo., assignor, by mesne assignments, to Ernest Reich, Chicago, Ill.

Application April 16, 1931, Serial No. 530,458

11 Claims. (Cl. 53—5)

The invention relates to heating apparatus and particularly to apparatus of the kind in which a pair of heating plates are brought in co-operative relation having interposed therebetween the article to be subjected to the influence of heat to render the same edible.

Apparatus of the kind described are known wherein a pair of heating plates are moved parallel to each other, there being means provided for causing said plates to engage the material interposed therebetween with variable pressure at the option of the user of the apparatus.

The device forming the subject matter of the present invention is distinguished from known devices therein that a large stationary heating plate is provided with which to co-operate a plurality of independent heating plates, which are individually controlled as to heat, distance from the lower plate and pressure exerted on the material interposed therebetween, so that a variety of foods may be prepared for eating purposes at the same time.

It is the further object of the invention to provide improved means for setting the pressure with which the two heating plates act on the material interposed therebetween.

The further object of the invention aims at arranging the top plate in such a manner that it may be easily locked in idle position and conveniently released to be placed in operative position, thereby saving time in the handling of the apparatus.

It is also an object of the invention to provide the top plate to pivot about two different horizontal axes, whereby the top plate may be arranged to afford accessibility to the stationary plate and to permit the top plate to adapt itself to uneven thicknesses of the material which is subjected to the heat treatment.

It is also an object of the invention to provide certain details of construction and arrangement tending to enhance the effectiveness and the reliability of a device of this character.

With these and other equally important objects in view which will become apparent from a perusal of the invention, the latter comprises the means described in the following specification, particularly pointed out in the claims forming a part thereof and illustrated in the accompanying drawings, in which:

Fig. 4 is a cross-section through the apparatus.

Fig. 6 is a fragmentary detailed section of the heating plates.

Fig. 7 is a detail section of a further modification.

Figure 1:
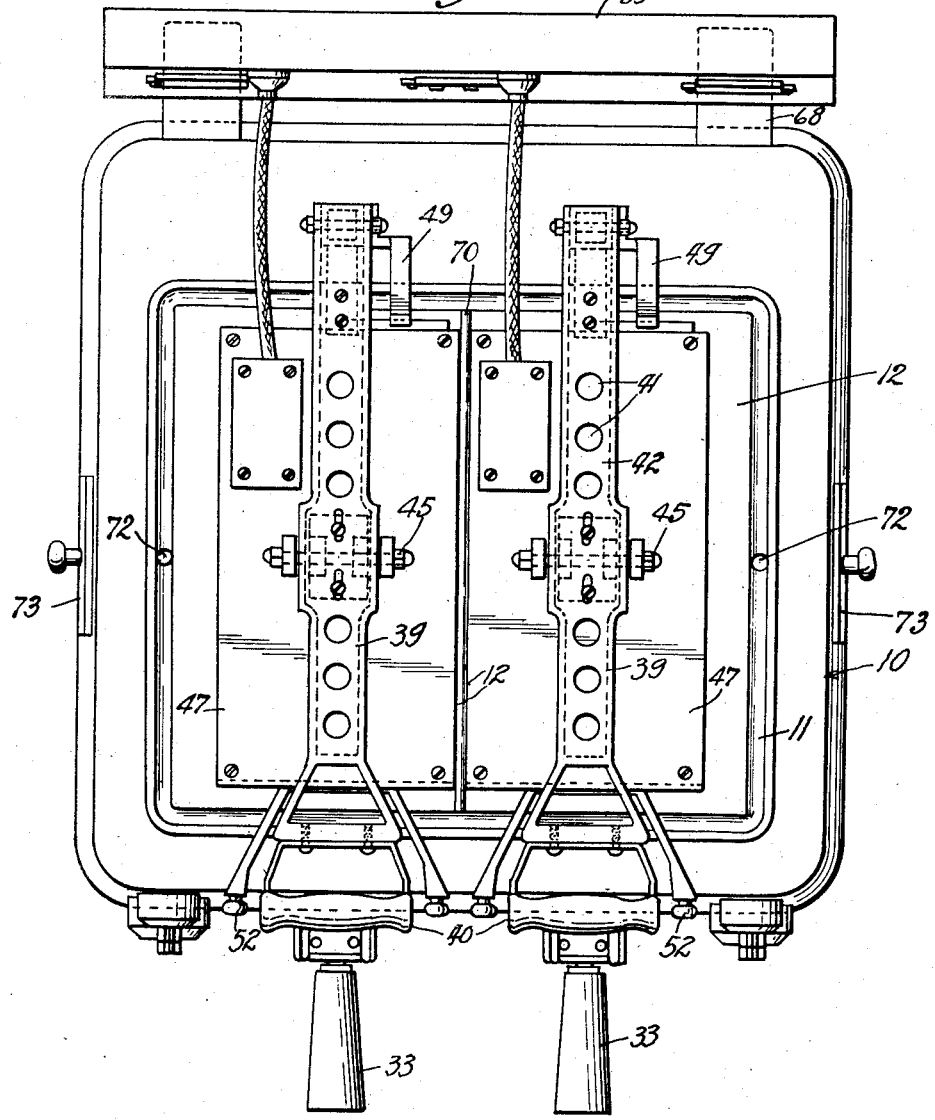
Fig. 1 is a top plan view of the apparatus constructed in accordance with my invention.
Figure 5:
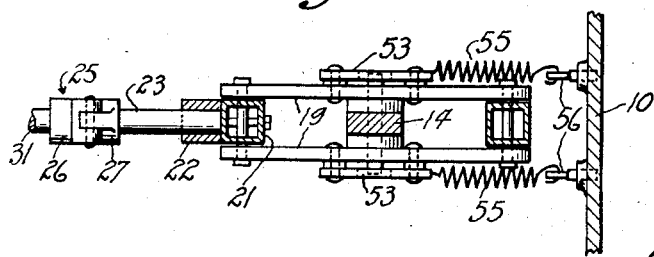
Fig. 5 is a section on the line 5—5 of Fig. 3.
Figure 3:
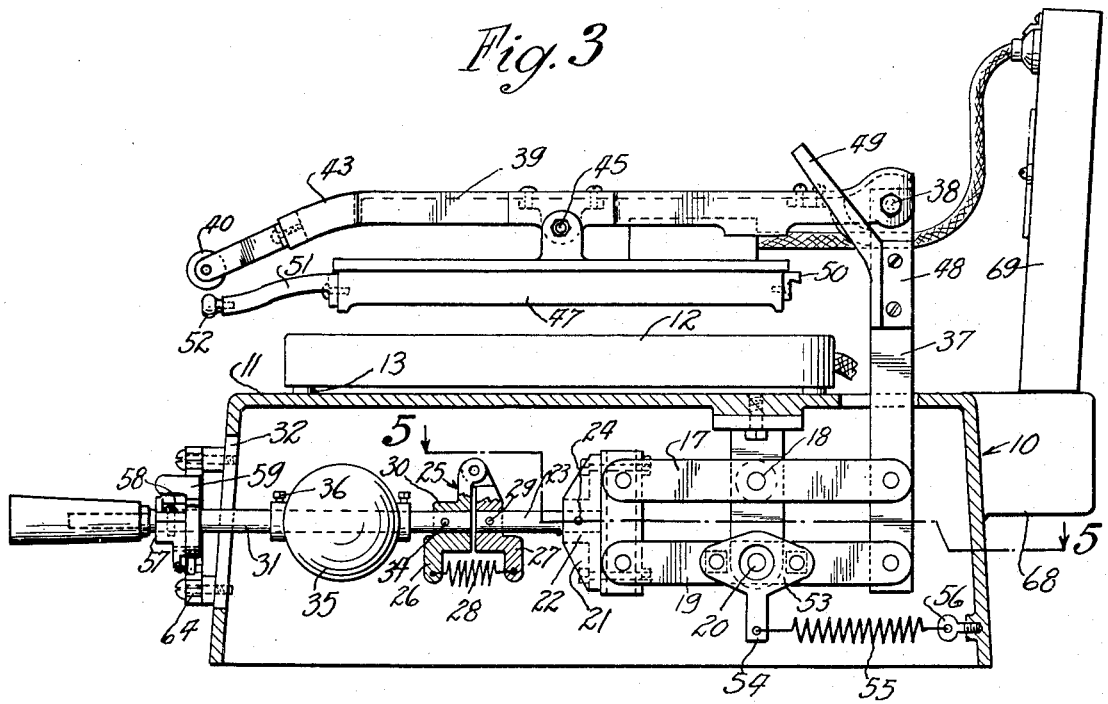
Fig. 3 is a section on the line 3—3 of Fig. 2.
Figure 2:
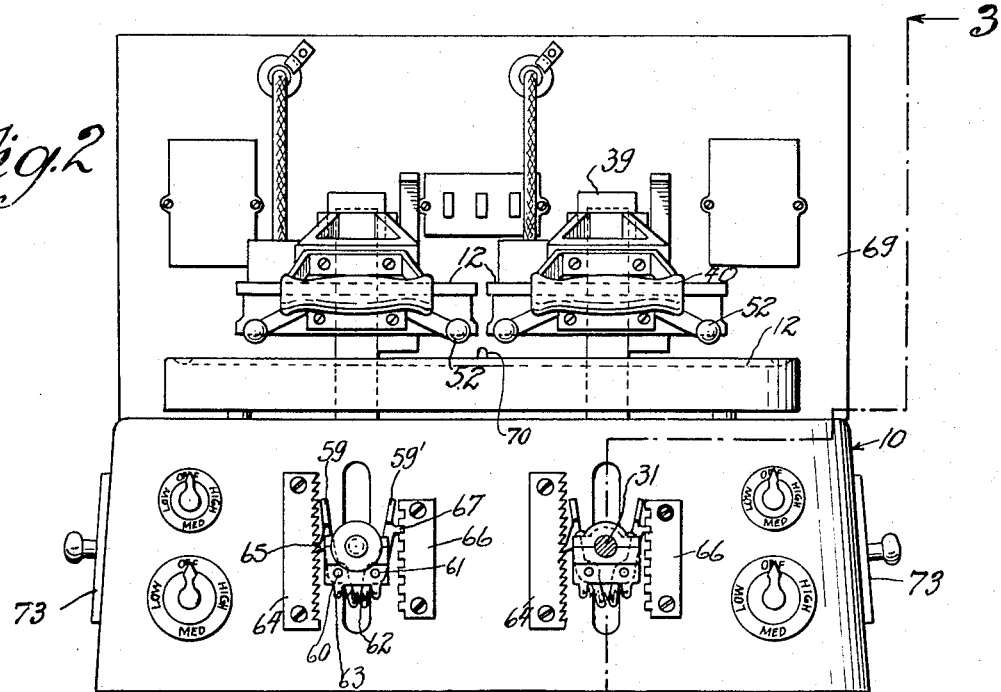
Fig. 2 is a front view of the apparatus showing the top plates in operative position.

The apparatus shown in the various figures of the drawings comprises a hollow base 10 being open at the bottom and closed at the top by a wall 11 on which is mounted in stationary relation a heating plate 12 spaced from the wall 11 by a plurality of legs 13.

Inasmuch as the heating plate 12 is electrically heated, the proper insulation is provided between the plate and the base 10 as will be readily understood by those versed in the art.

To the under side of the wall 11 is secured a bracket 14 which comprises a horizontal plate 15 screwed to the wall 11 and a depending arm 16 extending downwardly from the plate 15.

A pair of links 17 one on each side of the arm 16 is pivotally secured thereto as at 18, and a second pair of links 19 is similarly secured to the arm 16 at the pivot 20.

The left end as viewed in Fig. 4 of the link pairs 17 and 19 are pivotally secured to a bearing member 21 of a width adapted to fit between said links and provided with a central socket 22 to receive therein a rod 23, which is held in the socket by threaded engagement therewith, or if preferred by a pin 24.

A hinge generally designated by 25 comprises two pivotally connected members 26, 27 which at the free ends are connected by a spring 28. The hinge member 27 is formed with a central bore to receive therein the free end of the rod 23, a pin 29 securing the rod to the hinge member.

The companion hinge member 26 is provided with a hub 30 to receive the end of a rod 31 which extends through a vertical slot 32, in the side wall of the base 10 and is equipped with a handle 33 as may be readily seen by reference to the drawings.

The rod 31 is secured in the hub by a pin 34 and is provided intermediate the adjacent side wall of the base and the hinge member 26 with a counter-weight 35 comprising a ball or similar weight formed with a central bore for the passage of the rod 31 and being provided with set screws 36 to secure the counter-weight in a fixed position on the rod 31.

The right ends of the links 17, 19 are pivoted to a vertical member 37 which in the present instance is made tubular and of rectangular cross section and constitutes a support for the top heating plate and associated parts as will be presently described.

To the upper end of the vertical member 37 is pivotally secured as at 38 a lever arm 39 formed at the outer end with a handle 40 for convenient manipulation of said lever.

The lever 39 is substantially constructed as a channel iron and a plurality of apertures 41 are provided in the web 42 to eliminate weight.

The flanges of the channel lever 39 extend downwardly and the lever at the outer end is equipped with a curved portion 43 to further facilitate manipulation thereof.

To the lower face of the web 42 adjacent to the pivoted end of the lever 39 a lug 44 is secured which is adapted to enter into contact with the inner face of the vertical member 37 as soon as the lever 39 occupies a horizontal position and thus is adapted to co-operate with the lower heating plate 12.

Intermediate the ends of the lever 39 a pivot pin 45 is secured which extends also through upstanding lugs 46 of the heating plate 47 of oblong rectangular shape and adapted to co-operate with the lower heating plate 12.

The heating plate 47 is adapted to oscillate around the pivot 45 and in addition participates in the oscillatory movement of the lever 39 when the latter is swung around its pivot 38.

To the side face of the member 37 is secured a bracket 48 equipped with an arm 49 extending upwardly and outwardly.

The heating plate 47 at the rear end has secured thereto an angle iron 50 which engages with the free end of the supporting arm 49 in which case the heating plate is locked in idle position to afford accessibility to the lower heating plate 12.

The heating plate 47 at the forward end is also equipped with a pair of prongs 51 terminating in the knobs 52 and arranged close to the handle 40 for a purpose hereinafter further described.

To the links 19 and centrally thereof are secured plates 53 formed integral with a dependent arm 54 to the lower end of which is secured one end of a spring 55, the other end thereof being secured to an eye bolt 56 secured in the rear wall of the base 10.

To the rod 31 between the handle 33 and the wall of the base 10 is secured a bearing 57 comprising an upper and lower part held together by screws 58 for convenient assembly on the rod 31.

A pair of arms 59 and 59' are pivotally secured at 60 and 61 to the lower part of the bearing 57, and are connected at the lower end by a spring 62 to an extension 63 of the bearing, so that the arms 59 and 59' are held in a position to urge the upper ends to extend outwardly.

A rack 64 is provided to one side of the slot 32 and secured to the side wall of the base the adjacent arm 59 having a tooth 65 adapted to engage with the rack 64.

Another rack 66 is provided adjacent to the other arm 59' and secured to the wall of the base 10 and receives a tooth 67 of the adjacent arm.

The base 10 is provided with an extension 68 at its rear side to form a support for a cabinet or back rack 69 adapted to contain the electrical equipment necessary for the operation of the device and preventing thereby short circuits or other defects in the electrical equipment by reason of hot grease or fats or the like coming in contact with sensitive parts of the electrical equipment.

As shown in the drawings, the apparatus contains a large stationary heating plate and a pair of co-operating upper heating plates, one of which only has been described as the other heating plate is of identical construction and, therefore, does not require description.

It is, of course, understood that the number of top plates used in connection with the single bottom plate is only dependent on the size of the bottom plate, so that units with four top plates may be used or even a large number may be employed, especially in restaurants where a great many people are being catered to.

In order to provide means for preventing fat or grease from the food contained in one unit to reach an adjacent unit, a rib 70 is provided on the bottom heating plate 12 which extends throughout the width of the plate and space of individual top heating plates 47.

Instead of a rib, a groove 71 may be provided between adjacent units to prevent grease or the like from passing from one unit to the other, so as to preclude the mixture of food sauces or juices and thereby spoil the taste of the food.

Attention is called to the fact that the top plate is counter-balanced, so that in the operative position, that is, when the top plate occupies a horizontal position no pressure is exerted thereby on the material, assuming that the material is bulky enough to be then in contact with the top plate upon the latter being brought in horizontal position.

The counter-balancing is obtained by the weight 35 acting in downward direction on the lever constituted by the rods 23 and 31 exerting a downward pressure about the pivots 18 and 20, while the member 37 and lever 39 and the plate 47 are forced upwardly, and the two systems, to-wit: the one lying to the left of the vertical plane defined by the pivots 18 and 20, and the parts lying to the right of said plate are compensated as far as weight is concerned, so that the manipulation of the top plate from the idle into operative position can be effected with ease.

The spring 55 acting on the arm 54 constitutes an additional means for aiding the weight 35 to counter-balance the weight of the parts lying to the right of the vertical plane defined by the pivots 18 and 20.

The device is used in the following manner:

The lever 43 is arranged in the position shown in full lines in Fig. 4, in which the top plate 47 is locked against movement by the abutment arm 49.

The material (not shown) is placed on the lower stationary heating plate 12, whereupon the upper heating plate is released by grasping the handle 40 swinging the lever 43 slightly to the right as viewed in Fig. 4, engaging with the thumb the adjacent knobs 52 to tilt the plate 47 about its pivot 45, so that subsequently in the movement of the lever in counter-clockwise direction, the angle iron 50 clears the abutment arm 49, and permits lowering of the lever into horizontal position until the lug 44 engages the vertical member 37.

At this time no contact exists between the upper plate and the material to be heated, and for this reason the plate must be lowered, which is done in the following manner:

The operator seizes the handle 33 with one hand and with the other hand withdraws the arms 59 and 59', thereupon the handle 33 is raised until the top plate 47 is lowered sufficiently until the material arranged on the bottom plate 12 contacts therewith.

The arms 59 and 59' are then released and are received in the adjacent recesses of the respective racks 64 and 66. If it is desired to exert pressure on the material the arms 59 and 59' are again released and the handle 33 raised. Such raising, however, merely spreads the hinge members 26 and 27 and places the top plate 47 and associated parts under tension, so as to exert pressure on the material. Once the system has been adjusted for a certain material then it becomes unnecessary to again adjust the apparatus because the original adjustment applies in all similar cases. If by way of example steaks of the same thickness are to be broiled the adjustment for the original steak remains for all subsequent steaks to be broiled, so that the apparatus may be operated with convenience and rapidity, and a large number of people may be served in the shortest possible time.

It is noteworthy that if, for instance, four top plates have been used, one unit may be used for the preparation of steak, the other for liver, the next for chicken, and another for chops. Of course a selection of meats is merely given by way of example and not by way of limitation as any food material may be employed in connection with the apparatus. When once the units have been adjusted for particular kind of food then further adjustment becomes unnecessary and the apparatus may be employed with no further adjustment other than raising the top plate to insert the material and lowering the plate. In preparing the various sorts of foods, the provision of the ribs or grooves to prevent mixing of food sauces plays an important role, so that the taste of each food is not spoiled or deteriorated.

In order to reclaim the juices or fats which accumulate on the lower heating plate by reason of the heating process drain holes 72 are provided through which such juices escape into subjacent grease boxes 73 constituting a reservoir. The fats or juices accumulating therein may be used again for other purposes.

It is also important that the back rack 69 containing the electrical equipment is completely removed from the scene of operation of the apparatus, so that no harmful effects are possible and the operativeness of the device is insured.

It is also important that the machine constructed in accordance with the invention conserves space, that it requires only one attendant and may be operated with great rapidity, so that a large number of people may be served within the shortest possible time.

The preferred embodiment of the invention shown in the drawings is given only by way of illustration and not limitation, nor are the uses mentioned in the specification limited to the particular ones enumerated hereinbefore.

It is, therefore, not my intention of limiting myself to the details of construction and arrangement of parts as shown, but I wish to include all such changes, re-arrangements, modifications and revisions constituting departures within the scope of the invention as defined in the appended claims.

I claim:

1. In a heating apparatus, a standard supported for vertical movement, a lever pivotally supported on said standard, a heating plate carried by said lever, and releasable means for locking said plate against pivotal movement in one direction at a predetermined point intermediate the final positions of said plate.

2. In a heating apparatus, a standard supported for vertical movement, a lever pivotally supported on said standard, a heating plate pivotally secured to said lever, means including an abutment for locking said lever against pivotal movement on said standard in one direction at a predetermined point intermediate its end positions, and means on said plate permitting actuation of said plate to clear said abutment.

3. A heating apparatus, including a base, a stationary bottom plate mounted thereon, a lever provided with a break joint pivotally secured in said base and protruding therefrom, a standard passing through said base and secured to the inner end of said lever, a top plate carried by said standard, a weight on said lever to counterbalance said top plate, a ratchet on said base adapted to receive a lug on said lever to lock the same against movement and yieldable means for additionally counter-balancing said plate.

4. A heating apparatus, including a base, a stationary bottom plate mounted thereon, a lever pivotally secured in said base and protruding therefrom, a standard passing through said base and secured to the inner end of said lever, a top plate carried by said standard, a weight carried by said lever to counter-balance said top plate, a ratchet on said base adapted to receive a lug on said lever to lock the same against movement, and a break joint in said lever affording pressure to be imparted to said top plate.

5. A heating apparatus, including a base, a stationary bottom plate mounted thereon, a lever fulcrumed in said base and protruding therefrom for manipulation, a standard passing through said base and secured to the inner end of said lever, a top plate carried by said standard, means for locking said lever in adjusted position, and means including a break joint for actuating said lever to impart pressure to said top plate.

6. In an electric grill, the combination with a stationary lower unit and a movable upper unit constituting the grill proper, of a movable rod on which the upper unit is mounted in a definite position, whereby the movement of this rod upwardly will not disturb the parallel relationship between the two electric units, a lever pivoted to said rod and pivotally mounted below the units, a counterweight on the lever for reducing the pressure with which the upper unit rests on the lower unit, a counterbalancing spring connected with said lever for the same purpose as the weight, and means whereby the effect of the weight can be relieved while the weight is still connected with the lever, leaving the spring to constitute the sole counterbalance.

7. In an electric grill, the combination of a fixed lower unit, a movable upper unit, a parallel motion connection for raising and lowering the upper unit comprising a lever having two arms pivotally connected together above the center thereof, a spring for yieldingly holding said arms in a straight line, and two counterbalancing devices, one connected with each arm.

8. In an electric grill, the combination of a fixed lower unit, a movable upper unit, means for raising and lowering the upper unit comprising a lever having two arms pivotally connected together above the center thereof, a spring for yieldingly holding said arms in a straight line, a counterbalancing device connected with each arm, said upper unit being pivotally connected with said rod, and a stop on the upper unit for engaging the rod to prevent the upper unit from moving from its position parallel with the lower unit, said upper unit being movable about said pivot to an inclined position.

9. In an electric grill, the combination of a fixed lower heating unit, a movable upper heating unit, a parallel motion for raising and lowering the heating unit comprising a variable reciprocable rod on which the upper unit is mounted in horizontal position, a lever pivoted to a stationary part of the lower unit and pivotally connected with said rod at one end and having a handle and counterweight at the other, said lever consisting of two parts pivoted together at a point above the bottom of the lever, a spring connecting the two parts to normally hold them together, and a spring connected with the part that is pivoted to the rod and constantly acting to hold the rod up.

10. In an electric grill, the combination of a fixed lower heating unit, a movable upper heating unit, a parallel motion for raising and lowering the heating unit comprising a variable reciprocable rod on which the upper unit is mounted in horizontal position, a lever pivoted to a stationary part of the lower unit and pivotally connected with said rod at one end and having a handle and counterweight at the other, said lever consisting of two parts pivoted together at a point above the bottom of the lever, a spring connecting the two parts to normally hold them together and a spring connected with the part that is pivoted to the rod and constantly acting to hold the rod up, a counterweight fixed to the free end of the lever beyond the point of pivotal connection of the two parts normally assisting in holding the rod up whereby when the rod moves up to separate the upper unit, the braking of the joint formed by the pivoting of the two parts of the lever will relieve the lever from the action of the counterweight.

11. A heating apparatus, including a stationary bottom plate, a top plate movably supported above said bottom plate adapted to be placed in co-operative position with said bottom plate, an adjustable lever for varying the vertical position of the upper plate, and a resilient overload release in said lever.

A. GOVOROFF.